(12) United States Patent
Gong et al.

(10) Patent No.: US 9,879,880 B2
(45) Date of Patent: Jan. 30, 2018

(54) ELECTRIC HEATER, AND APPARATUS, HEATING AND AIR CONDITIONING SYSTEM, AND VEHICLE COMPRISING THE SAME

(71) Applicants: SHENZHEN BYD AUTO R&D COMPANY LIMITED, Shenzhen, Guangdong (CN); BYD COMPANY LIMITED, Shenzhen, Guangdong (CN)

(72) Inventors: Qing Gong, Guangdong (CN); Xinping Lin, Guangdong (CN); Maolin Ren, Guangdong (CN); Xiaofang Li, Guangdong (CN); Tianyou Deng, Guangdong (CN); Shumin Wang, Guangdong (CN); Hui Wu, Guangdong (CN); Mengxiang Wu, Guangdong (CN); Hongmei Qiu, Guangdong (CN); Huaitong Wen, Guangdong (CN); Weifeng Zhang, Guangdong (CN)

(73) Assignees: SHENZHEN BYD AUTO R&D COMPANY LIMITED, Shenzhen, Guangdong (CN); BYD COMPANY LIMITED, Shenzhen, Guangdong (CN)

(*) Notice: Subject to any disclaimer, the term of this patent is extended or adjusted under 35 U.S.C. 154(b) by 743 days.

(21) Appl. No.: 14/260,465

(22) Filed: Apr. 24, 2014

(65) Prior Publication Data
US 2014/0319114 A1   Oct. 30, 2014

(30) Foreign Application Priority Data

Apr. 28, 2013  (CN) .......................... 2013 1 0155520
Apr. 28, 2013  (CN) ..................... 2013 2 0224102 U

(51) Int. Cl.
*F24H 3/04* (2006.01)
*B60H 1/00* (2006.01)
(Continued)

(52) U.S. Cl.
CPC ....... *F24H 3/0405* (2013.01); *B60H 1/00471* (2013.01); *B60H 1/2225* (2013.01);
(Continued)

(58) Field of Classification Search
CPC combination set(s) only.
See application file for complete search history.

(56) References Cited

U.S. PATENT DOCUMENTS 5,284,025 A   2/1994  Kajitani et al.
5,642,856 A   7/1997  Samukawa et al.
(Continued)

FOREIGN PATENT DOCUMENTS

CA   2701199 A1   10/2011
CN   2883056 Y    3/2007
(Continued)

OTHER PUBLICATIONS

English Translation of CN201146614—Nov. 5, 2008.*

*Primary Examiner* — Anne M Antonucci
*Assistant Examiner* — Renee M. LaRosa
(74) *Attorney, Agent, or Firm* — Finnegan, Henderson, Farabow, Garrett & Dunner, LLP

(57) ABSTRACT

An electric heater, and an apparatus, a heating and air conditioning system and a vehicle, each comprising the electric heater, are provided. The electric heater comprises an outer frame; a heating core configured to connect to a power source and disposed within the outer frame; and a sealing-waterproof glue member disposed within the outer frame and configured to encase at least one end of the heating core. The heating core further comprises: a plurality of heat dissipating components and heating components arranged alternately, and each of the heat dissipating component is coupled with a heating component via a thermal conductor. Each of the heating components further com-
(Continued)

prises a core tube and a positive temperature coefficient thermistor disposed in the core tube.

20 Claims, 11 Drawing Sheets

(51) Int. Cl.
  *B60H 1/22*   (2006.01)
  *F24H 9/00*   (2006.01)
  *F24H 9/20*   (2006.01)
  *F24H 9/18*   (2006.01)
  *H05B 3/04*   (2006.01)
  *H05B 3/50*   (2006.01)

(52) U.S. Cl.
  CPC ......... *F24H 3/0435* (2013.01); *F24H 9/0063* (2013.01); *F24H 9/0073* (2013.01); *F24H 9/1872* (2013.01); *F24H 9/2071* (2013.01); *H05B 3/04* (2013.01); *H05B 3/50* (2013.01); *B60H 2001/2287* (2013.01); *H05B 2203/02* (2013.01); *H05B 2203/023* (2013.01)

(56) References Cited

U.S. PATENT DOCUMENTS

| | | | |
|---|---|---|---|
| 7,026,584 B2* | 4/2006 | Bohlender | B60H 1/2225 219/548 |
| 8,680,435 B2* | 3/2014 | Bohlender | F24H 3/0405 219/202 |
| 2003/0132222 A1* | 7/2003 | Bohlender | F24H 3/0405 219/504 |
| 2005/0167169 A1* | 8/2005 | Gering | B60H 1/00278 237/12.3 B |
| 2006/0013574 A1* | 1/2006 | Ito | B60H 1/2225 392/485 |
| 2006/0046632 A1 | 3/2006 | Goupil, Jr. et al. | |
| 2007/0068927 A1* | 3/2007 | Bohlender | F24H 3/0405 219/505 |
| 2008/0173637 A1* | 7/2008 | Taguchi | H05B 3/50 219/523 |
| 2010/0282729 A1* | 11/2010 | Taguchi | H05B 3/50 219/202 |
| 2011/0068090 A1* | 3/2011 | Bohlender | B60H 1/2225 219/202 |
| 2013/0306622 A1* | 11/2013 | Gu | B60H 1/2225 219/534 |
| 2014/0124494 A1* | 5/2014 | Wei | H05B 3/24 219/202 |

FOREIGN PATENT DOCUMENTS

| | | |
|---|---|---|
| CN | 101259823 A | 9/2008 |
| CN | 101940060 A | 1/2011 |
| CN | 101987612 A | 3/2011 |
| CN | 102538095 A | 7/2012 |
| CN | 102843790 A | 12/2012 |
| CN | 202879439 U | 4/2013 |
| CN | 203327269 U | 12/2013 |
| EP | 2083607 A1 | 7/2009 |
| EP | 2249618 A1 | 11/2010 |
| EP | 2397788 A1 | 12/2011 |
| GB | 878038 | 9/1961 |
| JP | S 61-36219 A | 2/1986 |
| JP | S 62-137215 A | 6/1987 |
| JP | H 10-82550 A | 3/1998 |
| JP | 2001-001751 A | 1/2001 |
| JP | 2001-230057 A | 8/2001 |
| JP | 2005-522826 A | 7/2005 |
| JP | 2005-276835 A | 10/2005 |
| JP | 2006-327574 A | 12/2006 |
| JP | 2007-125967 A | 5/2007 |
| JP | 2010-071213 A | 4/2010 |
| JP | 2010-117110 A | 5/2010 |
| JP | 2011-088506 A | 5/2011 |
| KR | 10-2012-0140349 A | 12/2012 |
| KR | 10-2004-0031444 A | 4/2013 |
| WO | WO 2007-049746 A1 | 5/2007 |
| WO | WO 2009-096007 A1 | 8/2009 |
| WO | WO 2012-011295 A1 | 1/2012 |

* cited by examiner

ELECTRIC HEATER, AND APPARATUS, HEATING AND AIR CONDITIONING SYSTEM, AND VEHICLE COMPRISING THE SAME

CROSS-REFERENCE TO RELATED APPLICATIONS

This application claims priority to and benefits of Chinese Patent Application Serial No. 201310155520.5 and No. 201320224102.2, both filed with the State Intellectual Property Office of China (SIPO) on Apr. 28, 2013. The entire contents of the above-referenced applications are incorporated herein by reference.

FIELD

Embodiments of the present disclosure generally relate to the field of heating and air conditioning, particularly to an electric heater, and an apparatus, a heating and air conditioning system and a vehicle, each comprising the electric heater.

BACKGROUND

Conventional oil-fueled vehicle employs an oil-fueled heating system or a waste-heat heating system to defrost and to heat for warming. For hybrid vehicle, when the engine stops, there can be a need to defrost, defog and heat, and for the pure electric vehicle without engine, it is impossible to employ traditional methods to defrost, defog and heat. In addition, the battery storage capacity of the hybrid vehicle and the pure electric vehicle may be low. If the batteries are used to defrost, defog and heat, the mileage of the vehicle may be reduced. Therefore, there is a need to develop a heating system suitable for hybrid vehicles and for pure electric vehicles.

SUMMARY

Embodiments of the present disclosure seek to solve at least one of the problems existing in the related art to at least some extent.

Embodiments of the present disclosure provide an electric heater, which includes an outer frame, a heating core disposed within the outer frame, and a sealing-waterproof glue member disposed within the outer frame. The heating core includes a first end and a second end. At least one of the first and second ends is configured to connect to a power source. The sealing-waterproof glue member is configured to encase the at least one of the first and second ends of the heating core. The heating core further comprises a plurality of heat dissipating components and a plurality of heating components. The heating component includes a core tube and a positive temperature coefficient thermistor disposed in the core tube. The heating components and the heat dissipating components are arranged alternately, and adjacent heating component and heat dissipating component are spaced apart from each other and are coupled with each other via a thermal conductor.

In some embodiments, the thermal conductor is a thermally conductive silicone rubber.

In some embodiments, the heating core further includes a first connecting piece disposed at the at least one end of the first and second ends of the heating core, the heating component further includes a second connecting piece disposed in the core tube and electrically coupled with the positive temperature coefficient thermistor, the second connecting piece includes an extending part extended out of the core tube and electrically coupled with the first connecting piece, and the first connecting piece and the extending part are disposed within the sealing-waterproof glue member.

In some embodiments, the electric heater further includes a protective tube disposed on a side of the heating core and a sealing-waterproof glue layer coated on the sealing-waterproof glue member.

In some embodiments, the core tube includes two load-bearing walls and two heat dissipating walls opposed to the heat dissipating components adjacent thereto.

In some embodiments, the thickness of the heat dissipating wall is greater than that of the load-bearing wall.

In some embodiments, the load-bearing wall includes a recessed arc portion protruded toward an interior of the core tube. Therefore, a sealing-waterproof glue may be easily filled into the heating core, and the core tube may not be inclined during the filling of the sealing-waterproof glue. The structure of the electric heater may be more stable, thus improving a waterproofness of the electric heater.

In some embodiments, the sealing-waterproof glue member is made of a silicone rubber having a heat-resistance temperature no less than 280 Celsius degrees and a heat conductivity coefficient no less than 1.4 W/(m·K).

In some embodiments, the heating component further includes an insulating member disposed between the core tube and the positive temperature coefficient thermistor, and the insulating member includes a ceramic plate.

In some embodiments, the heat dissipating component includes two connecting sheets and a heat dissipating sheet disposed between the two connecting sheets, and the heat dissipating sheet includes a corrugated aluminum sheet.

In some embodiments, the heating core further includes a low-voltage controlling component disposed between the outer frame and an outermost heat dissipating component.

In some embodiments, the low-voltage controlling component includes a temperature sensor mounted on the outermost heat dissipating component.

Embodiments of the present disclosure also provide a vehicle, which includes an electric heater according to any one mentioned above.

Embodiments of the present disclosure also provide an apparatus for heating up air, which includes a housing comprising an air outlet, an electric heater disposed in the housing, and an air blower comprising a blowing outlet and disposed in the housing. The electric heater comprises: an outer frame, a heating core disposed within the outer frame, wherein the heating core comprises a first end and a second end, wherein at least one of the first and second ends is configured to connect to a power source, and a sealing-waterproof glue member disposed within the outer frame and configured to encase the at least one of the first and second ends of the heating core. The heating core further comprises a plurality of heat dissipating components and a plurality of heating components. The heating component includes a core tube and a positive temperature coefficient thermistor disposed in the core tube. The heating components and the heat dissipating components are arranged alternately, and adjacent heating component and heat dissipating component are spaced apart from each other and are coupled with each other via a thermal conductor.

In some embodiments, the apparatus further includes an air chute disposed between the blowing outlet and the electric heater, wherein the air chute comprises a plurality of inclined plates configured to direct air blown out from the blowing outlet towards the electric heater.

In some embodiments, the plurality of inclined plates include an upper plate, a lower plate, a right plate and a left plate, wherein the right and left plates are coupled with the upper and lower plates and are inclined toward an interior of the air chute.

In some embodiments, the air chute further comprises a guiding structure configured to change a direction of the air blown out via the blowing outlet.

In some embodiments, the guiding structure comprises a left blade and a right blade, wherein the left and right blades are inclined toward a center of the air chute respectively.

In some embodiments, the upper and lower plates are inclined towards the same direction.

Embodiments of the present disclosure also provide a heating and air conditioning system, which includes an electric heater. The electric heater comprises: an outer frame, a heating core disposed within the outer frame, wherein the heating core comprises a first end and a second end, and at least one of the first and second ends is configured to connect to a power source, and a sealing-waterproof glue member disposed within the outer frame and configured to encase the at least one of the first and second ends of the heating core. The heating core further comprises a plurality of heat dissipating components and a plurality of heating components. The heating component includes a core tube and a positive temperature coefficient thermistor disposed in the core tube. The heating components and the heat dissipating components are arranged alternately, and adjacent heating component and heat dissipating component are spaced apart from each other and are coupled with each other via a thermal conductor.

With the electric heater according to embodiments of the present disclosure, at least one end of the heating core is entirely encased by the sealing-waterproof glue member, that is, high-voltage components, such as the first connecting piece, the second connecting piece and electric wires, are completely sealed in the sealing-waterproof glue member, and therefore the electric heat may have an excellent waterproofness. Even when the electric heater is placed in water, it may still have a good safety. In some embodiments, both two ends of the heating core are encased by the sealing-waterproof glue member, that is, both ends of the heating core is filled with and encased by the sealing-waterproof glue, such that the sealing-waterproof glue member and the heating core form an integral structure. Therefore, the waterproofness of the electric heater may be further improved, and a connection performance and earthquake-proof characteristics of the heating core may be improved.

Moreover, the core tube has a unique structure, which may further improve the waterproofness of the electric heater and benefit the manufacturing of the electric heater and the heat transfer of the positive temperature coefficient thermistor. Other performances, such as breakdown resistance, high-voltage resistance and vibration resistance, may be greatly improved.

The apparatus having the electric heater mentioned above may be used for defrosting or defogging the vehicle, for example, a defroster, and the apparatus may have a good safety and a long service life. Also, the apparatus may have a low energy consumption, which may lengthen the driving mileage of the vehicle. In addition, the apparatus is easy to manufacture, and may have a wide application.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
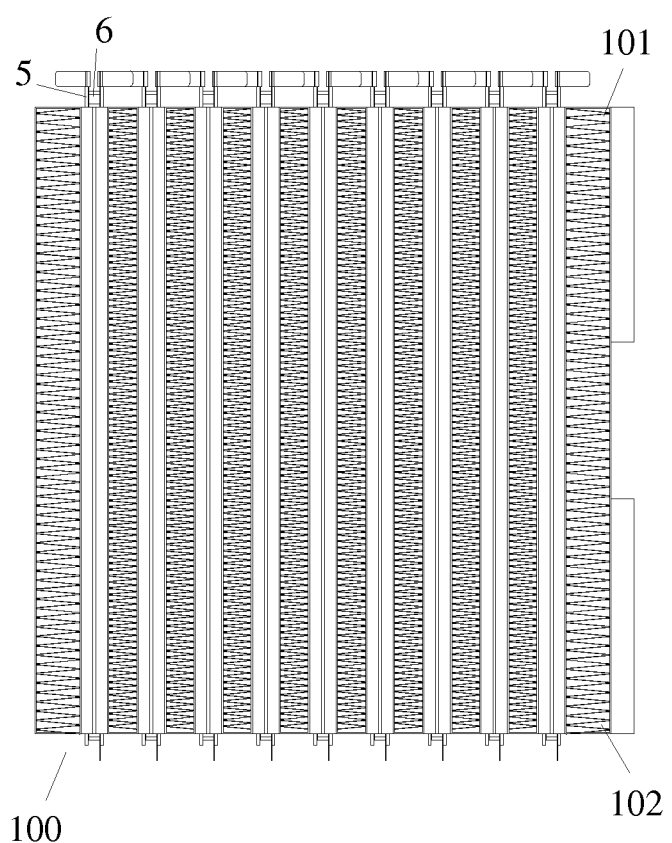
FIG. 1 is a schematic view of a heating core of an electric heater according to an embodiment of the present disclosure, wherein an end of the heating core is not encased by a sealing-waterproof glue member.

Reference will be made in detail to embodiments of the present disclosure. The same or similar components and the components having same or similar functions are denoted by like reference numerals throughout the descriptions. The embodiments described herein with reference to drawings are explanatory, illustrative, and used to generally understand the present disclosure. The embodiments shall not be construed to limit the present disclosure.

In the specification, unless specified or limited otherwise, relative terms such as "upper", "lower", "right", "left", "horizontal", "vertical" as well as derivative thereof (e.g., "horizontally", "downwardly", "upwardly", etc.) should be construed to refer to the orientation as then described or as shown in the drawings under discussion. These relative terms are for convenience of description and do not require that the present disclosure be constructed or operated in a particular orientation.

The electric heater according to embodiments of the present disclosure will be described with reference to the drawings below.

Figure 7:
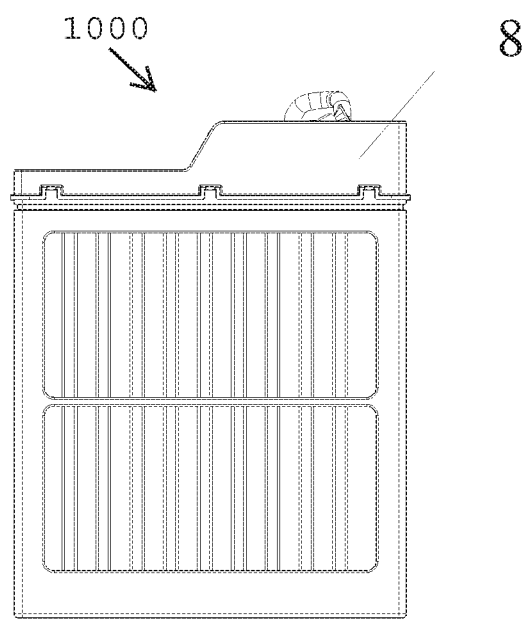
FIG. 7 is a schematic front view of an electric heater according to an embodiment of the present disclosure.
Figure 8:
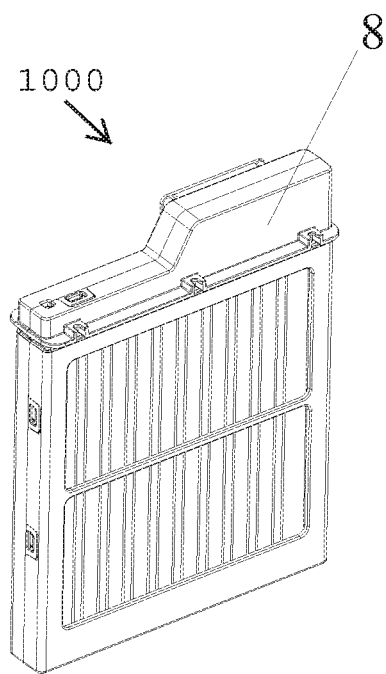
FIG. 8 is a schematic perspective view of an electric heater according to an embodiment of the present disclosure.

FIG. 7 and FIG. 8 show an electric heater 1000 according to embodiments of the present disclosure. As shown in FIGS. 7-8, the electric heater 1000 includes an outer frame 8, a heating core 100 disposed within the outer frame 8, and a sealing-waterproof glue member 1.

In some embodiments, the electric heater includes more than one heating core 100, and there are no particular limitations for the connection and position relationships between these heating cores 100.

As shown in FIGS. 1-5, the heating core 100 includes a plurality of heat dissipating components 3 and a plurality of heating components 2. The heat dissipating components 3 and the heating components 2 are arranged alternately in a lateral direction (the up and down direction in FIG. 2, or the right and left direction in FIG. 1) and disposed in parallel with each other, and the heating component 2 and the heat dissipating component 3 adjacent to each other are spaced apart from each other and connected with each other via, for example, a thermally conductive silicone rubber.

In some embodiments, the outer frame 8 may include four frame plates or shells disposed at four sides of the heating core 100 respectively, and the four frame plates may be connected with each other via any known manners. In addition, the outer frame 8 may be formed as a box. In the present disclosure, there are no particular limitations for the structure and material of the outer frame 8, and the outer frame 8 may have any known structure or may be made of any known material. Thus, descriptions of the structure and the materials of the outer frame 8 are omitted here.

Figure 2:
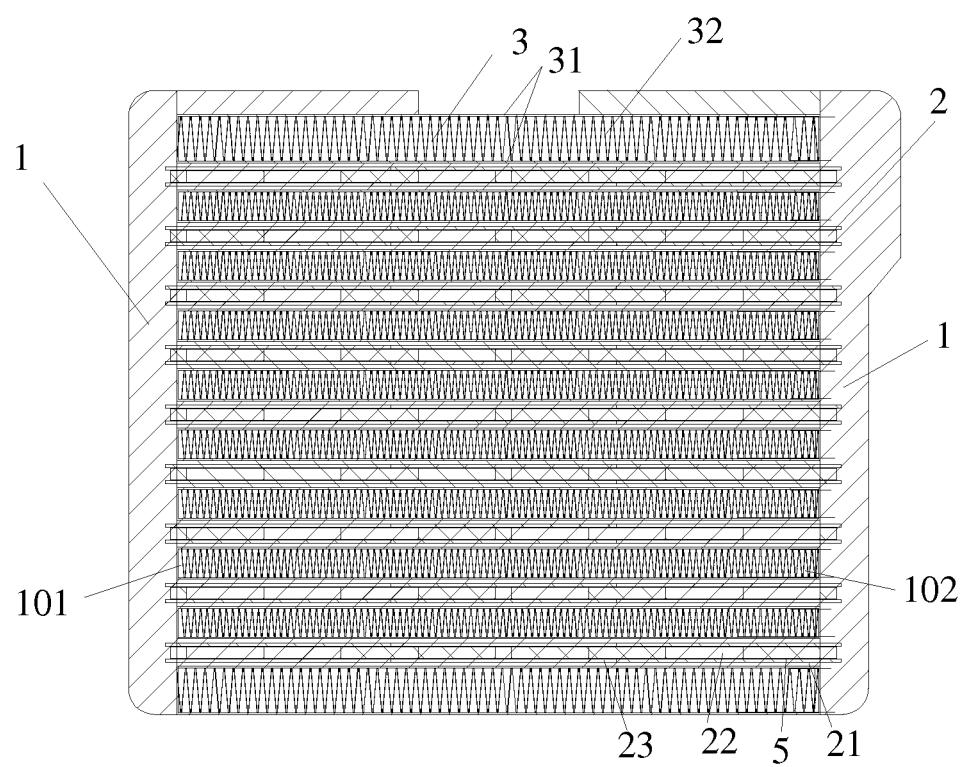
FIG. 2 is a schematic view of a heating core of an electric heater according to an embodiment of the present disclosure, wherein an end of the heating core is encased by a sealing-waterproof glue member.

As shown in FIG. 1, the heating core 100 has a first end 101 and a second end 102 in a longitudinal direction (the up and down direction in FIG. 1 or the right and left direction in FIG. 2). At least one of the first and second ends 101, 102 is configured to connect to a power source (not shown). For example, the first end 101 may be connected to external power sources.

Figure 3:
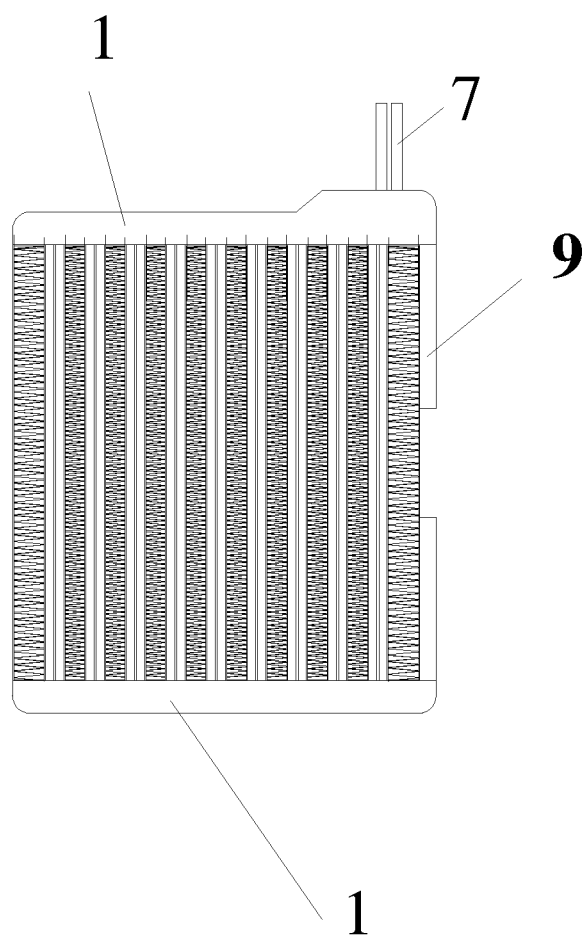
FIG. 3 is a schematic view of a heating core of an electric heater according to an embodiment of the present disclosure, in which both ends of the heating core are encased by sealing-waterproof glue members.
Figure 4:
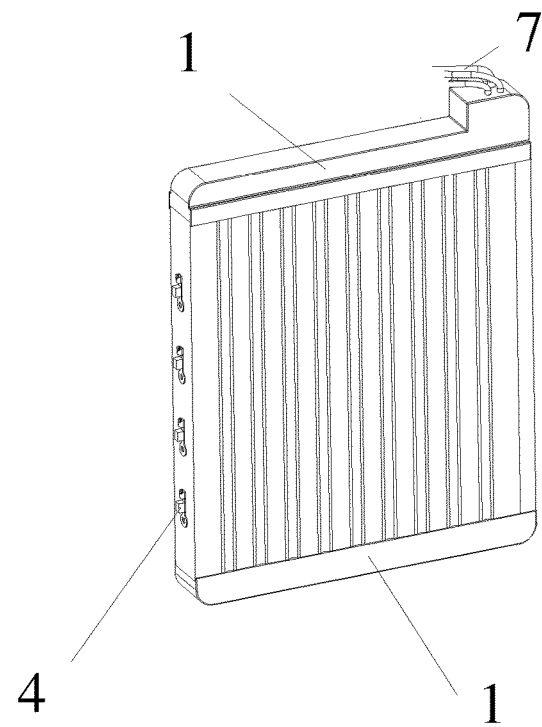
FIG. 4 is a schematic perspective view of a heating core of an electric heater according to an embodiment of the present disclosure, in which both ends of the heating core are encased by sealing-waterproof glue members.

As shown in FIG. 3, in some embodiments, the heating core 100 further includes a first connecting piece 6 disposed at the at least one end (e.g., the first end 101 in FIG. 1) of the heating core 100 and connected with an electric wire 7. The electric wire 7 is connected with an external power source. There are no particular limitations for the electric wire 7. The electric wire 7 may extend out of the outer frame 8 from one or more ends of the outer frame 8. For example, if the first connecting pieces 6 are disposed at two ends 101, 102 of the heating core 100, the electric wire 7 may extend out of the outer frame 8 from two ends of the outer frame 8.

Referring to FIG. 2, the heating component 2 includes a core tube 21 and a positive temperature coefficient thermistor 22 disposed in the core tube 21. The heating component 2 further includes a second connecting piece 5 disposed in the core tube 21 and electrically connected to the positive temperature coefficient thermistor 22. The second connecting piece 5 has an extending part extended out of the core tube 21 and electrically connected to the first connecting piece 6.

Referring to FIGS. 1 and 2, in some embodiments, the extending part of the second connecting piece 5 may be electrically connected to the first connecting piece 6 in any suitable manners. For example, a conductive member may be disposed between the first connecting piece 6 and the second connecting piece 5. The second connecting piece 5 may be extended out of the core tube 21 and then connect with the first connecting piece 6, so that the core tube 21 may be connected with the external power source via the first connecting piece 6. The first connecting piece 6 and the extending part of the second connecting piece 5 are disposed within the sealing-waterproof glue member 1.

Referring to FIGS. 7 and 8, in some embodiments, the sealing-waterproof glue member 1 is disposed within the outer frame 8 and is configured to encase at least one end (e.g., the first end 101) of the heating core 100. In some embodiments, two ends 101, 102 of the heating core 100 are encased by the sealing-waterproof glue members 1 respectively. Therefore, two ends 101, 102 of the heating core 100 may be disposed within the outer frame 8. That is, ends of the core tubes 21, of the heat dissipating components 3, and of spaces between the core tubes 21 and the heat dissipating components 3 are filled with the sealing-waterproof glue.

In some embodiments, the heating core 100 may be electrically connected to an external power source at one end of the heating core 100, and the heating core 100 may also be electrically connected to an external power source at two ends of the heating core 100. That is, the first connecting piece 6 may be disposed at one end of the heating core 100 or at two ends of the heating core 100. Also, there are no particular limitations for the number of the first connecting pieces 6 disposed at each end of the heating core 100. For example, the heating core 100 may include two first connecting pieces 6 vertical to the end of the heating core 100. The first connecting piece 6 may have a strip shape. The two first connecting pieces 6 clamp a plurality of the second connecting pieces 5 to electrically connect with the second connecting pieces 5.

Figure 13:
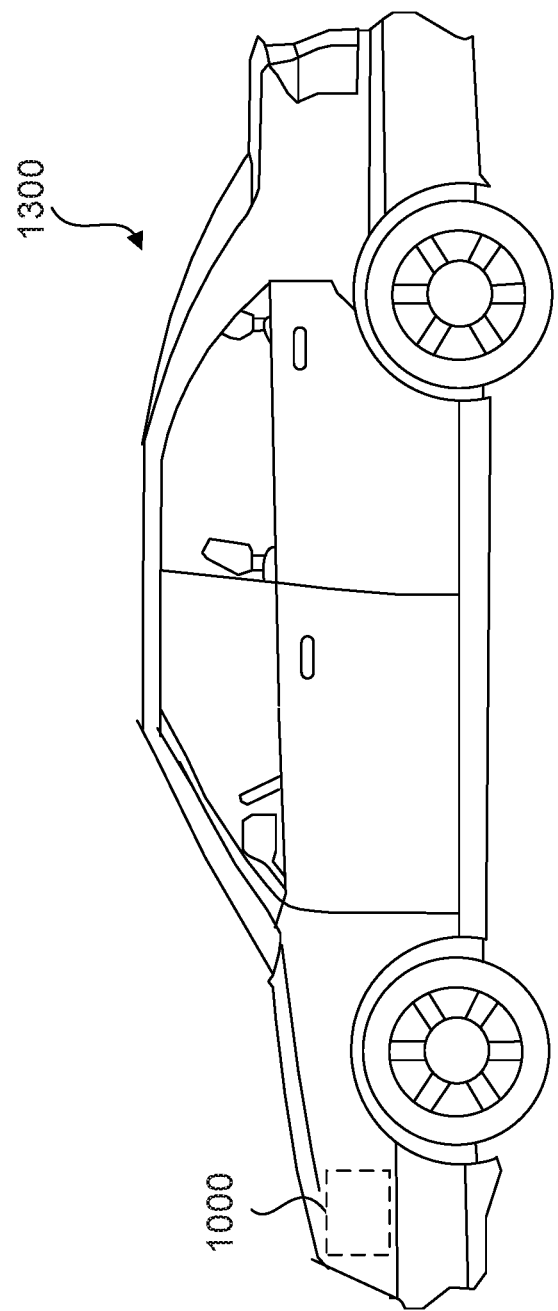
FIG. 13 schematically illustrates a vehicle having an electric heater.

In some embodiments, both of the first and second ends of the heating core 100 are encased by the sealing-waterproof glue member 1. Thus, the core tube 21 may be sealed better, and high-voltage components may be sealed in the core tube 21 better. Therefore, the electric heater may have a better waterproofness, which improves the safety of the electric heater when it is placed in water. As shown in FIG. 13, a vehicle 1300 may include an electric heater 1000 according to the disclosed embodiments. The electric heater 1000, which has good safety, a long service life and low energy consumption, can be used for defrosting or heating the vehicle 1300, and therefore the driving mileage of the vehicle 1300 may be extended.

In some embodiments, a sealing-waterproof glue layer may be coated on the sealing-waterproof glue member 1. The sealing-waterproof glue layer may be coated together with the sealing-waterproof glue member 1, and the sealing-waterproof glue layer and the sealing-waterproof glue member 1 may also be coated individually and then form an integral structure. Thus, the whole ends of the heating core 100 may be covered by the sealing-waterproof glue, such that the waterproofness of the electric heater and connection performance of the heating core 100 may be further improved. In one embodiment, the electric wire 7 is coated with the sealing-waterproof glue, and therefore the waterproofness of the electric heater may further improved.

In embodiments of the present disclosure, there are no particular limitations for shape of the sealing-waterproof glue member 1, and the sealing-waterproof glue member 1 may have different shapes according to actual needs. Also, there are no particular limitations for the method of manufacturing the sealing-waterproof glue member 1. For example, the sealing-waterproof glue member 1 may be manufactured by a mold filling and curing method, that is, a mold matched with ends of the heating core 100 may be pre-designed, the heating core 100 is then placed in the mold, a sealing-waterproof glue is then filled into the mold and cured, and then the heating core 100 is taken out. With this method, ends of the heating core 100 may be seamlessly encased by the sealing-waterproof glue.

In one embodiment, the sealing-waterproof glue member 1 is made of a silicone rubber. The silicone rubber may be processed by special treatment, such as special heat treatment. In one embodiment, the silicone rubber has a heat-resistance temperature no less than 280 Celsius degrees, a heat conductivity coefficient no less than 1.4 W/(m·K) and a cohesiveness no less than 4 MPa.

Referring to FIG. 3, in some embodiments the electric heater further includes a protective tube 9 disposed on at least one longitudinal one side of the heating core 100. The protective tube 9 and an outmost heat dissipating component 3 are arranged side by side. The protective tube 9 is used to protect devices, such as miniature fuses and temperature controlled switches, disposed on the side of the heating core 100. The electric heater may include more than one protective tube 9. In one embodiment, the electric heater includes two protective tubes 9, one end of one protective tube 9 is disposed at one end of the heating core 100, and one end of the other protective tube 9 is disposed at the other end of the heating core 100. That is, the two protective tubes 9 art disposed opposite to each other. In some embodiments, the protective tube 9 also includes an aluminum tube, and the aluminum tube includes four walls having different thicknesses, and a load-bearing wall of the aluminum tube has a recessed arc portion.

In some embodiments, the core tube 21 includes an aluminum tube, and the positive temperature coefficient thermistor 22 is disposed in the core tube 21. When the positive temperature coefficient thermistor 22 is powered on, the positive temperature coefficient thermistor 22 is heated. The heat may be first transferred to the core tube 21, which then transfers the heat to the heat dissipating component 3, from which the heat is then taken away by air. In embodiments of the present disclosure, two open ends of the aluminum tube are covered and encased by the sealing-waterproof glue, and therefore the waterproofness of the electric heater may be further improved.

Figure 5:
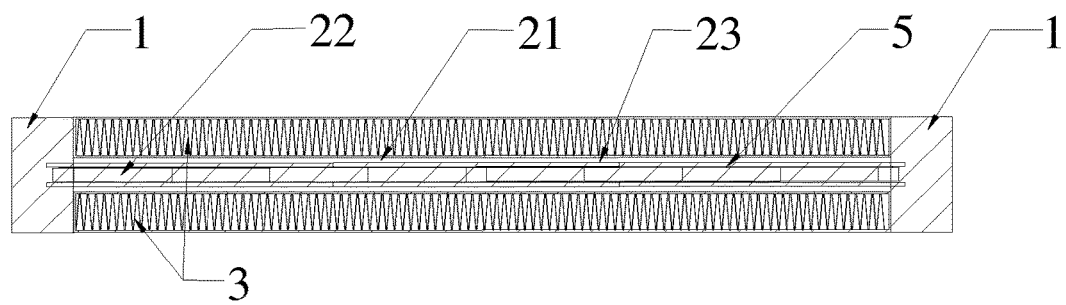
FIG. 5 is a schematic partial enlarged view of a heating core of an electric heater according to an embodiment of the present disclosure, in which both ends of the heating core are encased by sealing-waterproof glue members.
Figure 6:
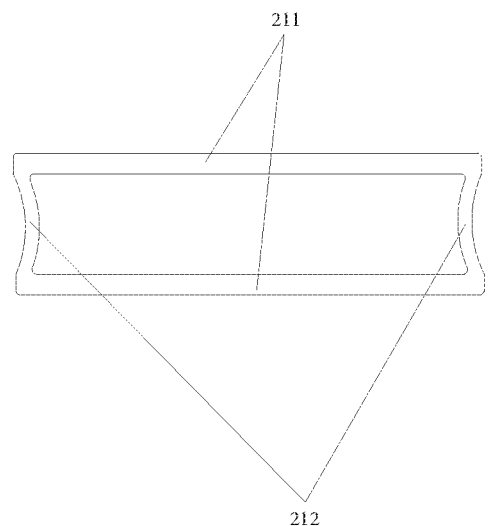
FIG. 6 is a schematic view of a core tube of an electric heater according to an embodiment of the present disclosure.

FIG. 6 shows an exemplary implementation of core tube 21. As shown in FIG. 6, the core tube 21 includes two load-bearing walls 212 and two heat dissipating walls 211 to be opposed to the heat dissipating components 3 of FIGS. 2 and 5 adjacent thereto. In one embodiment, a thickness of the heat dissipating wall 211 is different from that of the load-bearing wall 212. In one embodiment, the thickness of the heat dissipating wall 211 is greater than that of the load-bearing wall 212, and therefore the heat dissipating wall 211 may be contacted with an insulating member, such as a ceramic member, more tightly, which is good for heat transferring for the positive temperature coefficient thermistor 22. In embodiments of the present disclosure, the thickness of the heat dissipating wall 211 is about 1.0 millimeter to about 1.4 millimeters, and the thickness of the load-bearing wall 212 is about 0.6 millimeters to about 1.0 millimeter. In one embodiment, the heat dissipating wall 211 has a thickness of 1.35 millimeters, and the load-bearing wall 212 has a thickness of 0.9 millimeters.

As shown in FIG. 6, in one embodiment, the load-bearing wall 212 has a recessed arc portion protruded toward an interior of the core tube 21. Therefore, the sealing-waterproof glue may be filled more easily; and during the filling of the sealing-waterproof glue, the core tube 21 is not inclined, and the structure is more stable. Therefore, the waterproofness of the electric heater may be further improved.

In embodiments of the present disclosure, there are no limitations for the height of the core tube 21, and it may be designed according to actual needs. For example, the height of the core tube 21 may be designed according to the size and structure of the positive temperature coefficient thermistor 22. In one embodiment, the core tube 21 has an outer height of 9.1 millimeters and an inner height of 6.5 millimeters.

Generally, the core tube 21 is made of a metal material. According to the material of the core tube 21, the heating component 2 may further include an insulating member disposed between the core tube 21 and the positive temperature coefficient thermistor 22. In one embodiment, the insulating member includes a ceramic plate, for example, an aluminum oxide ceramic plate 23. Since the ceramic plate has an excellent insulating property, high heat conductivity coefficient and good high-temperature resistance, the performance such as insulating property of the electric heater may be further improved.

In some embodiments, a thermally conductive silicone rubber is disposed between the core tube 21 and the heat dissipating component 3 adjacent to the core tube 21. Then, the core tube 21 and the heat dissipating component 3 are bonded to form the heating core 100. There are no particular limitations for the surface of the core tube 21, for example, a surface of the core tube 21 connected with the heat dissipating component 3 (i.e. a surface of the heat dissipating wall 211) may be processed via abrasive blasting to form an abrasive blasted surface. Before abrasive blasting, the surface of the core tube 21 may be subjected to coarsening treatment. After being processed by coarsening treatment and abrasive blasting, the thermally conductive silicone rubber is disposed between the core tube 21 and the heat dissipating component 3. Therefore, a bonding strength between the core tube 21 and the heat dissipating component 3 may be improved, which is good for the thermal conductivity.

In embodiments of the present disclosure, there are no particular limitations for the positive temperature coefficient thermistor 22, and the positive temperature coefficient thermistor 22 may be any common positive temperature coefficient thermistor known to those skilled in the art. Preferably, in the present disclosure, the positive temperature coefficient thermistor 22 has a high heating rate, a high power and low power consumption. Generally speaking, the positive temperature coefficient thermistor 22 includes a conductive substrate, a positive temperature coefficient material and a conductive electrode. The positive temperature coefficient material is disposed between two conductive substrates and coated on the conductive substrates, the conductive electrodes are disposed on the conductive substrates and connected to electrode terminals respectively, and the electrode terminals form a wiring harness to connect with a power source.

Referring to FIG. 5, in some embodiments, the positive temperature coefficient thermistor 22 is disposed in the core tube 21 to form the heating component 2, and an aluminum oxide ceramic plate 23 is clamped between the core tube 21 and the positive temperature coefficient thermistor 22. The aluminum oxide ceramic plate 23 has a good insulating property and an excellent thermal conductivity, such that the positive temperature coefficient thermistor 22 is insulated from the core tube 21 and heat generated by the positive temperature coefficient thermistor 22 may be transferred to the heat dissipating component 3 via the core tube 21 effectively.

The positive temperature coefficient thermistor 22 may have a high heating rate and a high power. Therefore, in some embodiments, two heat dissipating components 3 are disposed between adjacent heating components 2, and two heat dissipating components 3 are disposed between the outer frame 8 and an outermost heating component 2, thus enlarging a heat dissipating area.

It should be noted that, in some embodiments, one or more heat dissipating components 3 are disposed between adjacent heating components 2, and one or more heat dissipating components 3 are disposed between the outer frame 8 and the outermost heating component 2. The number of the heat dissipating components 3 may be designed according to the power of the positive temperature coefficient thermistor 22 and the heat dissipating efficiency of the heat dissipating component 3. In some embodiments, one or two heat dissipating components 3 are disposed between adjacent heating components 2, and two heat dissipating components 3 are disposed between the outer frame 8 and the outermost heating component 2. Therefore, heat may be transferred to the heat dissipating component 3 more quickly, and then be dissipated by the heat dissipating component 3 more efficiently.

Referring to FIG. 2, in some embodiments, the heat dissipating component 3 includes two connecting sheets 31 and a heat dissipating sheet 32 disposed between the two connecting sheets 21, and the heat dissipating sheet 32 has a corrugated shape. The connecting sheet 31 and the heat dissipating sheet 32 may be an aluminum sheet. For example, a connecting sheet 31 is manufactured from an aluminum sheet having a thickness of 0.8 millimeters, and a heat dissipating sheet 32 is manufactured by bending an aluminum sheet having a thickness of 0.5 millimeters to form a corrugated aluminum sheet, and then the heat dissipating sheet 32 is fixed between two connecting sheets 31 by soldering to form the heat dissipating component 3. Then, the heat dissipating component 3 may have a large heat dissipating area and a better heat dissipating efficiency. In embodiments of the present disclosure, the connecting sheet 31 may have an abrasive blasted surface, such that a bonding strength and a thermal conductivity between the core tube 21 and the heat dissipating component 3 may be improved.

Figure 12:
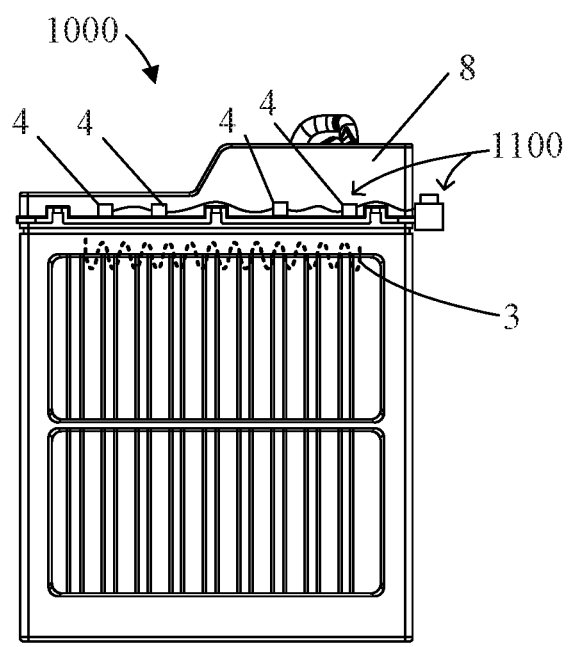
FIG. 12 schematically illustrates an electric heater including a low-voltage controlling component.

FIG. 12 schematically shows an electric heater 1000 having a low-voltage controlling component 1100. In some embodiments, the heating core 100 further includes the low-voltage controlling component 1100. The low-voltage controlling component 1100 may detect a parameter variation of the heating core 100, and then provide the parameter variation to a control system, which can then cut off the circuit, depending on the parameter variation, for the safety of the vehicle. In one embodiment, the low-voltage controlling component 1100 is disposed between the outer frame 8 and an outermost heat dissipating component 3, as shown in FIG. 12. Referring to FIG. 12, in one embodiment, the low-voltage controlling component 1100 includes one or more temperature sensors 4 (also shown in FIG. 4). The temperature sensors 4 may be riveted on the outermost heat dissipating component 3. The temperature sensors 4 may detect a temperature of the heat dissipating component 3, and when the temperature of the heat dissipating component 3 is higher than a predetermined value, the temperature sensors sensor 4 may provide the temperature to the control system, which may then cut off the circuit, depending on the temperature, for the safety of the vehicle.

Figure 9:
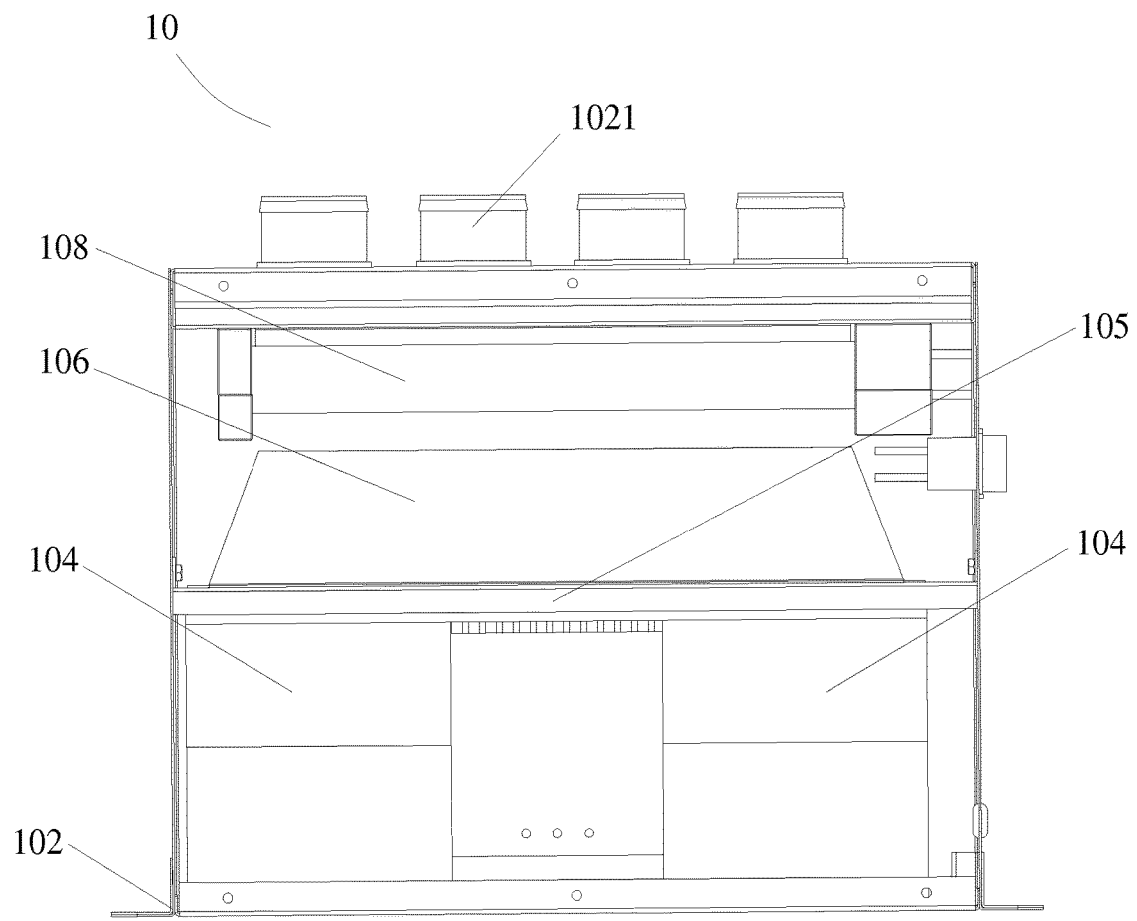
FIG. 9 is a schematic view of an apparatus according to an embodiment of the present disclosure.
Figure 10:
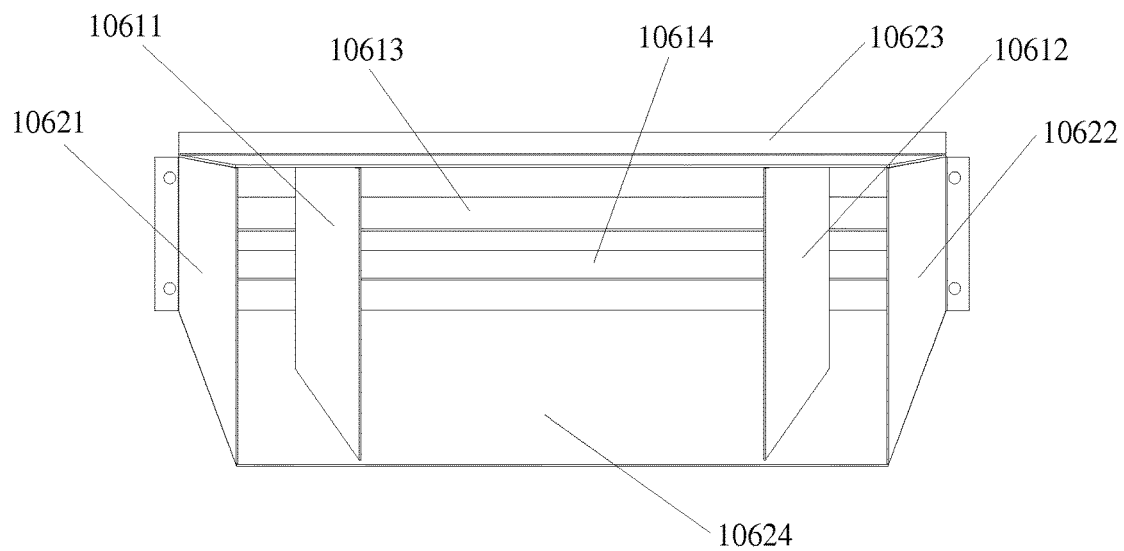
FIG. 10 is a schematic perspective view of an air chute of an apparatus according to an embodiment of the present disclosure.

Referring to FIGS. 9 and 10, according to the present disclosure, an apparatus (i.e. a defroster) 10 is provided. The apparatus 10 may include a housing 102 having an air outlet 1021, an electric heater 108 according to aforementioned embodiments of the present disclosure disposed in the housing 102, an air blower 104 having a blowing outlet 1041 and disposed in the housing 102, and an air chute 106.

In the present disclosure, there are no particular limitations for the housing 102 of the apparatus 10, and the housing 102 may be any common housing known to one of ordinary skill in the art. For example, the housing 102 may be a square housing manufactured from a metal plate.

In some embodiments, the air chute 106 is disposed between the blowing outlet 1041 and the electric heater 108. The air blown out from the blowing outlet 1041 by the air blower 104 passes through the air chute 106 and the electric heater 108, and then is discharged out via the air outlet 1021. Referring to FIG. 10, in some embodiments, the air chute 106 includes a shell. The shell includes an upper plate 10623, a lower plate 10624, a right plate 10622 and a left plate 10621, and the right plate 10622 and the left plate 10621 are connected to the upper plate 10623 and the lower plate 10624 and inclined toward an interior of the air chute 106. In some embodiments, the air chute 106 further includes a blade.

Referring back to FIG. 9, in some embodiments, the apparatus 10 further includes a supporting structure for fixing and supporting the air blower 104 in the apparatus 10. The supporting structure may be disposed inside the apparatus 10 and connected to the housing 102. Therefore, the air blower 104 is prevented from moving due to shaking when the vehicle is running. It should be noted that there are no particular limitations for the shape and structure of the supporting structure, and it may have any common shape and structure. Also, the connection type between the supporting structure and the housing 102 may be any common connection type. The supporting structure may be made of a metal.

Figure 11:
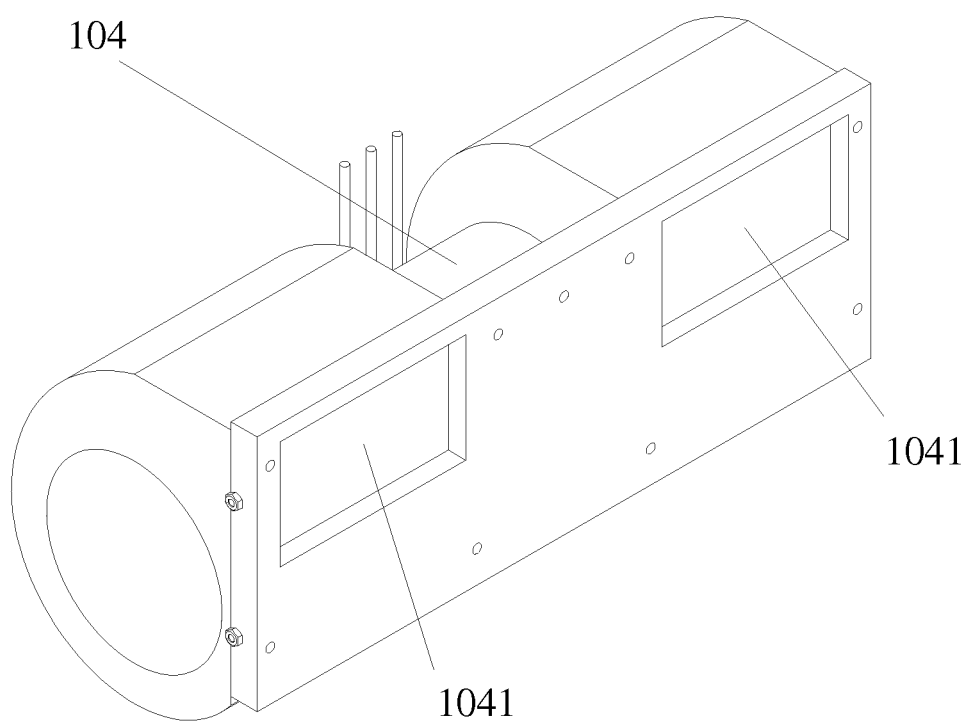
FIG. 11 is a schematic perspective view of an air blower of an apparatus according to an embodiment of the present disclosure.

Referring to FIGS. 10 and 11, in embodiments of the present disclosure, the air blower 104 includes a blowing outlet 1041 formed at one surface thereof. The air generated by the air blower 104 may be blown out from the blowing outlet 1041. There are no particular limitations for the number and position of the blowing outlets 1041, and it may be designed according to actual needs. For example, in one embodiment, the air blower 104 has one blowing outlet 1041, and when the blowing outlet 1041 is formed at a center of one surface of the air blower 104, there are a plurality of blades including a left blade 10611, a right blade 10612, an upper blade 10613 and a lower blade 10614 around the blowing outlet 1041; and the left blade 10611, the right blade 10612, the upper blade 10613 and the lower blade 10614 are inclined towards the shell of the air chute 106. Therefore, the air in the air chute 106 of FIG. 9 may be dispersed and blown to surfaces of parts of the electric heater 108 evenly, and a speed of the air is uniform. Also, in another embodiment, the air blower 104 has a plurality of blowing outlets 1041, and when the blowing outlets 1041 are formed at a periphery of one surface of the air blower 104, there are a plurality of blades including a left blade 10611, a right blade 10612, an upper blade 10613 and a lower blade 10614 around the blowing outlets 1041; and the left blade 10611, the right blade 10612, the upper blade 10613 and the lower blade 10614 are inclined towards the center of the air chute 106. Therefore, the air in the air chute 106 may be concentrated and blown to surfaces of parts of the electric heater 108 evenly, and a speed of the air is uniform.

In some embodiments, the air blower 104 has two blowing outlets 1041 formed at a top left corner and a top right corner of a surface of the air blower 104 respectively.

In some embodiments, a predetermined angle is formed between the blade and a surface of the air blower 104 where the blowing outlet 1041 is formed so as to change a direction of air blown out from the blowing outlet 1041. Therefore, the concentrated or dispersed air blown by the air blower 104 may be blown to the electric heater 108 evenly, and a speed and a temperature of the air blown out from the air outlet 1021 of the apparatus 10 are uniform. Therefore, parts of a windshield of the vehicle may have a consistent defrosting effect, and the total defrosted area may be enlarged.

In some embodiments, the air chute 106 is disposed between the blowing outlet 1041 and the electric heater 108, such that an air blown out from the blower outlet 1041 by the air blower 104 passes through the electric heater 108 to carry away a heat generated by the electric heater 108. The air chute 106, the air blower 104 and the electric heater 108 may be connected with each other or may not be connected with each other. In some embodiments, the air chute 106 is connected with the air blower 104, and the air chute 106 is connected to the supporting structure. The air chute 106 may be fixed to the supporting structure via edgings extending from edges of the opening of the air chute 106 and having screw holes. The blowing outlet 1041 is formed in an opening of the air chute 106 to make sure that air in the air blower 104 may be blown into the air chute 106. Moreover, the air chute 106 is fixed in the housing 102 of the apparatus 10. It should be noted that the air chute 106 may be fixed via an individual supporting structure.

In embodiments of the present disclosure, the blade may be movable and adjustable. In some embodiments, the blade may also be fixed and nonadjustable. In embodiments of the present disclosure, there are no particular limitations for the shape and material of the blade.

In some embodiments, the air blower 104 has two blowing outlets 1041 formed in a surface of the air blower 104 and spaced apart from each other in a right and left direction, as shown in FIG. 11. Left blades 10611 and right blades 10612 may divide the air chute 106, connected to the air blower 104, into several parts in a horizontal direction. There are no particular limitations for the number of the left blades 10611 and the right blades 10612. For example, in one embodiment, there are a plurality of blades including one left blade 10611 and one right blade 10612, and then the air chute 106 is divided into three parts in the horizontal direction. Also, there are no particular limitations for the size of the left blade 10611 and the right blade 10612, for example, the size of the left blade 10611 and the right blade 10612 may be smaller than that of the left plate 10621 and the right plate 10622. In one embodiment, upper and lower ends of the left blade 10611 and the right blade 10612 are connected to the upper plate 10623 and the lower plate 10624 respectively, front ends of the left blade 10611 and the right blade 10612 are located at an opening of the air chute 106 near to the electric heater 108, and the left blade 10611 and the right blade 10612 are located in front of the upper blade 10613 and the lower blade 10614.

In one embodiment, the air blower 104 has two blowing outlets 1041 formed at a top left corner and a top right corner of a surface of the air blower 104 respectively. The left blade 10611 and the right blade 10612 are inclined toward the center of the air chute 106 respectively. Therefore, the air may be concentrated and then blown to the electric heater 108 evenly, especially the central part of the electric heater 108 may be blown by the air evenly.

In some embodiments, an angle between the left blade 10611 and a vertical plane is about 30 degrees to about 45 degrees, and an angle between the right blade 10612 and a vertical plane is about 30 degrees to about 45 degrees. In one embodiment, the angle between the left blade 10611 and the vertical plane is 37.2 degrees, and the angle between the right blade 10612 and the vertical plane is 37.2 degrees.

In some embodiments, there are a plurality of blades including upper blades 10613 and lower blades 10614, and thus the air chute 106 may be divided into several parts in a vertical direction. There are no particular limitations for the number of the upper blades 10613 and the lower blades 10614. For example, in one embodiment, there are a plurality of blades including one upper blade 10613 and one lower blade 10614, and then the air chute 106 is divided into three parts in the vertical direction. Also, there are no particular limitations for the size of the upper blade 10613 and the lower blade 10614, for example, the size of the upper blade 10613 and the lower blade 10614 may be very small. In some embodiments, the upper blade 10613 and the lower blade 10614 may have a length of about 20 millimeters to about 30 millimeters. Therefore, the air in the air chute 106 may be blown to a lower part of the electric heater 108 evenly. In one embodiment, the upper blade 10613 has a length of 25 millimeters and the lower blade 10614 has a length of 25 millimeters. A left end of the upper blade 10613 and a right end of the upper blade 10613 are connected to the left plate 10621 and the right plate 10622 respectively, and a left end of the lower blade 10614 and a right end of the lower blade 10614 are connected to the left plate 10621 and the right plate 10622 respectively. The left blade 10611 and the right blade 10612 are located in front of the upper blade 10613 and the lower blade 10614, and rear ends of and the lower blade 10614 are located at the opening of the air chute 106 near to the blowing outlet 1041.

In one embodiment, the air blower 104 has two blowing outlets 1041 formed at a top left corner and a top right corner of a surface of the air blower 104 respectively. The upper blade 10613 and the lower blade 10614 are inclined downwardly. Therefore, the lower part of the electric heater 108 may be blown by the air in the air chute 106 evenly. In one embodiment, an angle between the upper blade 10613 and a horizontal plane is greater that an angle between the lower blade 10614 and a horizontal plane. Therefore, all parts of the electric heater 108 may be blown by the air more evenly. In some embodiments, the angle between the upper blade 10613 and the horizontal plane is about 10 degrees to about 50 degrees, and the angle between the lower blade 10614 and the horizontal plane is about 10 degrees to about 50 degrees. In one embodiment, the angle between the upper blade 10613 and the horizontal plane is 31 degrees, and the angle between the lower blade 10614 and the horizontal plane is 26 degrees.

In some embodiments, the air chute 106 includes a shell. The shell includes an upper plate 10623, a lower plate 10624, a right plate 10622 and a left plate 10621 connected with each other. There are no particular limitations for the connection between the upper plate 10623, the lower plate 10624, the right plate 10622 and the left plate 10621. For example, the upper plate 10623, the lower plate 10624, the right plate 10622 and the left plate 10621 may be integrally formed, and the upper plate 10623, the lower plate 10624, the right plate 10622 and the left plate 10621 may also be connected with each other in common connection ways. In one embodiment, the upper plate 10623, the lower plate 10624, the right plate 10622 and the left plate 10621 are connected with each other to form a rectangular frame. Also, there are no particular limitations for the size of the upper plate 10623, the lower plate 10624, the right plate 10622 and the left plate 10621. In some embodiments, the upper plate 10623 is relatively small.

In embodiments of the present disclosure, the air generated by the air blower 104 may be blown to the electric heater 108 evenly via the air chute 106 or the blade in the air chute 106. Moreover, a speed and a temperature of the air blown out from the air outlet 1021 of the apparatus 10 are uniform. Therefore, parts of the windshield of the vehicle may have a consistent defrosting effect, and the total defrosted area may be enlarged.

In some embodiments, the air blower 104 has two blowing outlets 1041 formed at two sides of a surface of the air blower 104 respectively. In one embodiment, the right plate 10622 and the left plate 10621 are inclined toward an interior of the air chute 106. Therefore, the air may be concentrated and then blown to the electric heater 108 evenly, especially the center part of the electric heater 108 may be blown by the air evenly. In some embodiments, an angle between the left plate 10621 and a vertical plane is about 10 degrees to about 34 degrees, and an angle between the right plate 10622 and a vertical plane is about 10 degrees to about 34 degrees. In one embodiment, the angle between the left plate 10621 and the vertical plane is 22 degrees, and the angle between the right plate 10622 and the vertical plane is 22 degrees.

In some embodiments, the air blower 104 has two blowing outlets 1041 formed at a top left corner and a top right corner of a surface of the air blower 104 respectively. The upper plate 10623 and the lower plate 10624 are inclined downwardly. Therefore, the lower part of the electric heater 108 may be blown by the air evenly. In one embodiment, an angle between the upper plate 10623 and a horizontal plane is smaller than an angle between the lower plate 10624 and a horizontal plane. Therefore, all parts of the electric heater 108 may be blown by the air more evenly. In some embodiments, the angle between the upper plate 10623 and the horizontal plane is about 0 degrees to about 10 degrees, and the angle between the lower plate 10624 and the horizontal plane is about 40 degrees to about 52 degrees. In one embodiment, the angle between the upper plate 10623 and the horizontal plane is 4 degrees, and the angle between the lower plate 10624 and the horizontal plane is 46 degrees.

According to embodiments of the present disclosure, a heating and air conditioning system is provided. The heating and air conditioning system includes an electric heater according to aforementioned embodiments of the present disclosure. It should be noted that other components of the heating and air conditioning system may be any common components known to one of ordinary skill in the art, and the electric heater and other components may be mounted via common mounting methods. The other components and the mounting methods are omitted here.

According to embodiments of the present disclosure, a vehicle that includes an electric heater according to aforementioned embodiments of the present disclosure is presented. It should be noted that there are no particular limitations for the mounting of the electric heater, for example, the electric heater may be firstly mounted in a apparatus (i.e. a defroster) or in a heating and air conditioning system, and then the apparatus or the heating and air conditioning system is mounted in the vehicle, especially a pure electric vehicle or a hybrid electric vehicle. The outer frame is matched with an air outlet of the heating and air conditioning system, or an air outlet of a draught fan of the vehicle. In summer, when the electric heater may not be operated, the air blown out of the electric heater can still be cold air. In winter, when the electric heater may be operated, the air blown out of the electric heater becomes hot air for heating, defrosting, or defogging the vehicle.

The present disclosure will be described in details with reference to the following examples.

EXAMPLE 1

Referring to FIG. 5, a positive temperature coefficient thermistor (PTC thermistor) is disposed in an aluminum tube, whose load-bearing wall has a thickness of 0.9 millimeters and whose heat dissipating wall has a thickness of 1.35 millimeters. The load-bearing wall has a recessed arc portion protruded toward an interior of the aluminum tube. The aluminum tube has an outer height of 9.2 millimeters and an inner height of 6.5 millimeters. An aluminum oxide ceramic plate is clamped between the PTC thermistor and an inner wall of the aluminum tube to form a heating component. The heating components and heat dissipating components are arranged alternately in a lateral direction and adjacent heating component and heat dissipating component are spaced apart from each other, and then the heating components and the heat dissipating components are bonded via a thermally conductive silicone rubber to form a heating core. Four temperature sensors are riveted on an outermost heat dissipating component. Then, two ends of the heating core are placed in a pre-designed mold, and then a silicone rubber having a heat-resistance temperature of 280 Celsius degrees, a heat conductivity coefficient of 1.4 W/(m·K) and a cohesiveness of 4 MPa is filled into the mold until the space between the mold and the heating core is full of the silicone rubber, and the silicone rubber is cured to form a sealing-waterproof glue member. A first connecting piece electrically connected to the PTC thermistor, a second connecting piece of the heating core, and two open ends of the aluminum tube are encased by the sealing-waterproof glue member. Then, an outer frame is mounted on the heating core to form an electric heater sample S1.

COMPARATIVE EXAMPLE 1

An electric heater sample DS1 is manufactured according to the method disclosed by Chinese Patent CN200820030975. A positive temperature coefficient thermistor (PTC thermistor) is disposed in an aluminum tube to form a heating component. The aluminum tube is a square tube having a wall thickness of 1.35 millimeters. A polymer insulating membrane is coated on the PTC thermistor, and two ends of the aluminum tube is filled with a silicone rubber and covered by an insulating shell. The heating components and heat dissipating components are arranged alternately in a lateral direction and adjacent heating component and heat dissipating component are spaced apart from each other, and then the heating components and the heat dissipating components are bonded via a thermally conductive silicone rubber to form a heating core. Then, an outer frame is mounted on the heating core to form the electric heater sample DS1.

COMPARATIVE EXAMPLE 2

A positive temperature coefficient thermistor (PTC thermistor) is coated by a polymer insulating membrane to form a heating component. The heating components and heat dissipating components are arranged alternately in a lateral direction and adjacent heating component and heat dissipating component are spaced apart from each other, and then the heating components and the heat dissipating components are bonded via a thermally conductive silicone rubber, which is cured to form a heating core. Then, an outer frame is mounted on the heating core to form an electric heater sample DS2. During the curing of the thermally conductive silicone rubber, a lot of bubbles appear, which may influence the performance, especially waterproofness of the electric heater.

Performance Test

Test for Waterproofness:

1. Electrical Property Test

A leakage current (at a voltage of 1.8 KVAV, leakage current less than 5 mA), an insulation resistance (at a voltage of 0.6 KVDC, insulation resistance greater than 1000MΩ) and a power (at a voltage of 320VDC at room temperature at an air speed of 4.5 m/s for 3 minutes) of an electric heater are detected, and a peak current and a steady current are recorded.

Then, the electric heater is dipped in a water tank (0.85 meters×0.85 meters×0.85 meters) and rested for 30 minutes. Then, the leakage current (at a voltage of 1.8 KVAV, leakage current less than 5 mA), and the insulation resistance (at a voltage of 0.6 KVDC, insulation resistance greater than 20 MΩ) of the electric heater are detected.

Then, the electric heater is placed in an oven at 130 Celsius degrees for 1.5 hours. After the electric heater is dried, the leakage current (at a voltage of 1.8 KVAV, leakage current less than 5 mA), the insulation resistance (at a voltage of 0.6 KVDC, insulation resistance greater than 1000MΩ) and the power (at a voltage of 320VDC at room temperature at an air speed of 4.5 m/s for 3 minutes) of the electric heater are detected, and the peak current and the steady current are recorded.

The test results are recorded in Tables 1, 2, and 3.

TABLE 1

| before being dipped in water | S1 | DS1 | DS2 |
|---|---|---|---|
| 1.8 KVAC leakage current (mA) | 3.49 | 3.70 | 3.72 |
| 0.6 KVDC insulation resistance | >1000 MΩ | >500 MΩ | >500 MΩ |
| peak current (A) | 23.6 | 24.6 | 24.9 |
| steady current (A) | 15.8 | 10.5 | 10.9 |
| power P (W) | 5056 | 3360 | 3488 |

TABLE 2

| after being dipped in water | S1 | DS1 | DS2 |
|---|---|---|---|
| 1.8 KVAC leakage current (mA) | 3.59 | NO | NO |
| 0.6 KVDC insulation resistance | >1000 MΩ | <1 MΩ | <1 MΩ |

TABLE 3

| after being dried | S1 | DS1 | DS2 |
|---|---|---|---|
| 1.8 KVAC leakage current (mA) | 3.30 | 3.72 | 3.73 |
| 0.6 KVDC insulation resistance | >1000 MΩ | >500 MΩ | >500 MΩ |
| peak current (A) | 23.8 | 24.8 | 24.8 |
| steady current (A) | 15.7 | 10.6 | 11 |
| power P (W) | 5024 | 3392 | 3520 |

As shown in Table 1, Table 2 and Table 3, after being dipped in water, electrical properties, such as the 1.8 KVAC leakage current, 0.6 KVDC insulation resistance, peak current, steady current and power, of the electric heater according to embodiments of the present disclosure is still good, which may indicate that the electric heater according to embodiments of the present disclosure has a good waterproofness.

2. Level of Waterproofness Test:

Level IPX X of waterproofness:

Level IPX 1:

Test method: vertical water dripping test.

Test equipment: water dripping test device.

The samples are placed on a turntable (sample stage) at 1 rpm, a distance between a top of the sample and a dripping nozzle is not greater than 200 millimeters, a water dripping rate is 10.5 mm/min, and a dripping time is 10 minutes.

Level IPX 2:

Test method: 15 degrees tilted dripping test.

Test equipment: water dripping test device.

The samples are placed on a turntable (sample stage) in such a way that an angle between a surface of the sample and a vertical plane is 15 degrees, and a distance between a top of the sample and a dripping nozzle is not greater than 200 millimeters. The samples are tested at a water dripping rate of 30.5 mm/min for a total of 10 minutes, 2.5 minutes for each of four surfaces.

Level IPX 3:

Test method: water spraying test.

a) Swing pipe spraying test.

Test equipment: swing pipe spraying test device.

A swing pipe having a proper radius is provided so that a height of the sample stage is located at a diameter location of the swing pipe. The samples are placed on the sample stage in such a way that a distance between a top of the sample and a water injection nozzle is not greater than 200 millimeters, and the sample stage is not rotatable. A water flow is calculated according to the number of the water injection nozzles, 0.07 L/min for each water injection nozzle. When spraying water to the samples, the water injection nozzles between ±60 degrees from the center of the swing pipe are working for spraying water to the samples. The samples are positioned at a center of a semicircle of the swing pipe. The swing pipe is oscillated at ±60 degrees from the vertical (120 degrees in total). The oscillation rate is two cycles of 120° in 4 seconds. The test is carried out for 10 minutes.

b) Sprayer nozzle spraying test.

Test equipment: handheld spraying and splashing test device.

The distance between a handheld sprayer nozzle and a top of the sample is in a range from 300 mm to 500 mm. A baffle plate with balance weights is mounted when testing. The flow rate is 10 L/min. Each square meter surface (not including a mounting surface) of the samples is tested for 1 minute, at least 5 minutes.

Level IPX 4:

Test method: splashing test.

b) Swing pipe splashing test.

The equipment and method for the swing pipe splashing test is substantially the same as those in a) of Level IPX 3, with the following exceptions. When spraying water to the samples, the water injection nozzles between ±90 degrees from the center of the swing pipe are working for spraying water to the samples. The samples are positioned at a center of a semicircle of the swing pipe. The swing pipe is oscillated at ±180 degrees from the vertical (360 degrees in total). The oscillation rate is two cycles of 360° in 12 seconds.

b) Sprayer nozzle splashing test.

The equipment and method for the swing pipe splashing test is substantially the same as those in b) of Level IPX 3, except that there is no baffle plate with balance weights.

Level IPX 5: jetting test.

Test equipment: a jet nozzle having an inner diameter of 6.3 mm.

The distance between the jet nozzle and the samples is in a range from 2.5 m to 3 m. A flow rate is 12.5 L/min (750 L/h). Each square meter surface (not including a mounting surface) of the samples is tested for 1 minute, at least 3 minutes.

Level IPX 6: strong jetting test.

Test equipment: a jet nozzle having an inner diameter of 12.5 mm.

The distance between the jet nozzle and the samples is in a range from 2.5 m to 3 m. A flow rate is 100 L/min (6000 L/h). Each square meter surface (not including a mounting surface) of the samples is tested for 1 minute, at least 3 minutes.

Level IPX 7: short-time dipping test.

Test equipment: water tank, which is dimensioned so that a distance between a bottom of a sample and a water surface is no less than 1 meter and a distance between a top of the sample and the water surface is no less than 0.15 meters when the sample is dipped in the water tank. The test time is 30 minutes.

The test results are recorded in Table 4.

TABLE 4

|  | S1 | DS1 | DS2 |
| --- | --- | --- | --- |
| Level of waterproofness | IPX7 | IPX3 | IPX3 |

It should be noted that: for the electric heater, the higher the level of waterproofness, the better the electric heater product is. Level IPX 7 is the highest level.

As shown in Table 4, the level of waterproofness of the electric heater according to the present disclosure may reach the highest level, i.e. level IPX 7, which is a great improvement over the traditional electric heater with a waterproofness at level IPX 3. The electric heater according to the present disclosure still can work normally even when it is dipped in a water tank at a depth of 1 meter. Also, other performances, such as breakdown resistance, high voltage resistance and vibration resistance, may be improved.

In addition, the electric heater according to the present disclosure is tested at 2200 VAC applied between electrode terminals and an A1 shell at a temperature of 25±2 Celsius degrees for 60 seconds to detect a leakage current, the result shows that the leakage current is not greater than 5 mA, and there is no electric breakdown or flashover. Also, the electric heater according to the present disclosure is tested at 600 VDC applied between electrode terminals and the A1 shell at a temperature of 25±2 Celsius degrees to detect an insulation resistance, and the result shows that the insulation resistance is no less than 500 MΩ.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. An electric heater, comprising:
an outer frame;
a heating core disposed within the outer frame, wherein the heating core comprises a first end and a second end, wherein at least one of the first and second ends is configured to connect to a power source; and
a sealing-waterproof glue member disposed within the outer frame and configured to encase the at least one of the first and second ends of the heating core;
wherein the heating core further comprises a plurality of heat dissipating components and a plurality of heating components, the heating component comprising a core tube and a positive temperature coefficient thermistor disposed in the core tube;
wherein the heating components and the heat dissipating components are arranged alternately, and adjacent heating component and heat dissipating component are spaced apart from each other and are coupled with each other via a thermal conductor;
wherein the heating core further comprises a first connecting piece disposed at the at least one of the first and second ends of the heating core;
wherein the heating component further comprises a second connecting piece disposed in the core tube and electrically coupled with the positive temperature coefficient thermistor;
wherein the second connecting piece includes an extending part extended out of the core tube and electrically coupled with the first connecting piece; and
wherein the first connecting piece and the extending part are disposed within the sealing-waterproof glue member.

2. The electric heater of claim 1, wherein the thermal conductor is a thermally conductive silicone rubber.

3. The electric heater of claim 1, further comprising a protective tube disposed on a side of the heating core.

4. The electric heater of claim 1, wherein the core tube comprises two load-bearing walls and two heat dissipating walls opposed to the heat dissipating components adjacent thereto.

5. The electric heater of claim 4, wherein the thickness of the heat dissipating wall is greater than that of the load-bearing wall.

6. The electric heater of claim 4, wherein the load-bearing wall includes a recessed arc portion protruded toward an interior of the core tube.

7. The electric heater of claim 1, wherein the sealing-waterproof glue member is made of a silicone rubber having a heat-resistance temperature no less than 280 Celsius degrees and a heat conductivity coefficient no less than 1.4 W/(m·K).

8. The electric heater of claim 1, wherein the heating component further comprises an insulating member disposed between the core tube and the positive temperature coefficient thermistor, wherein the insulating member comprises a ceramic plate.

9. The electric heater of claim 1, wherein the heat dissipating component comprises two connecting sheets and a heat dissipating sheet disposed between the two connecting sheets, and wherein the heat dissipating sheet comprises a corrugated aluminum sheet.

10. The electric heater of claim 1, wherein the heating core further comprises a low-voltage controlling component disposed between the outer frame and an outermost heat dissipating component.

11. The electric heater of claim 10, wherein the low-voltage controlling component comprises a temperature sensor mounted on the outermost heat dissipating component.

12. A vehicle, comprising an electric heater according to claim 1.

13. An apparatus for heating up air, comprising:
a housing comprising an air outlet;
an electric heater disposed in the housing; and
an air blower comprising a blowing outlet and disposed in the housing;
wherein the electric heater comprises:
an outer frame;
a heating core disposed within the outer frame, wherein the heating core comprises a first end and a second end, wherein at least one of the first and second ends is configured to connect to a power source; and
a sealing-waterproof glue member disposed within the outer frame and configured to encase the at least one of the first and second ends of the heating core;
wherein the heating core further comprises a plurality of heat dissipating components and a plurality of heating components, the heating component comprising a core tube and a positive temperature coefficient thermistor disposed in the core tube;
wherein the heating components and the heat dissipating components are arranged alternately, and adjacent heating component and heat dissipating component are spaced apart from each other and are coupled with each other via a thermal conductor;
wherein the heating core further comprises a first connecting piece disposed at the at least one of the first and second ends of the heating core;
wherein the heating component further comprises a second connecting piece disposed in the core tube and electrically coupled with the positive temperature coefficient thermistor;
wherein the second connecting piece includes an extending part extended out of the core tube and electrically coupled with the first connecting piece; and
wherein the first connecting piece and the extending part are disposed within the sealing-waterproof glue member.

14. The apparatus of claim 13, further comprising an air chute disposed between the blowing outlet and the electric heater, wherein the air chute comprises a plurality of inclined plates configured to direct air blown out from the blowing outlet towards the electric heater.

15. The apparatus of claim 14, wherein the plurality of inclined plates comprises an upper plate, a lower plate, a right plate and a left plate, wherein the right and left plates are coupled with the upper and lower plates and are inclined toward an interior of the air chute.

16. The apparatus of claim 15, wherein the upper and lower plates are inclined towards the same direction.

17. The apparatus of claim 14, wherein the air chute further comprises at least one blade configured to change a direction of the air blown out via the blowing outlet.

18. The apparatus of claim 17, wherein the at least one blade comprises a left blade and a right blade, wherein the left and right blades are inclined toward a center of the air chute respectively.

19. A heating and air conditioning system, comprising an electric heater, wherein the electric heater comprises:
an outer frame;
a heating core disposed within the outer frame, wherein the heating core comprises a first end and a second end, wherein at least one of the first and second ends is configured to connect to a power source; and
a sealing-waterproof glue member disposed within the outer frame and configured to encase the at least one of the first and second ends of the heating core;
wherein the heating core further comprises a plurality of heat dissipating components and a plurality of heating components, the heating component comprising a core tube and a positive temperature coefficient thermistor disposed in the core tube;
wherein the heating components and the heat dissipating components are arranged alternately, and adjacent heating component and heat dissipating component are spaced apart from each other and are coupled with each other via a thermal conductor;
wherein the heating core further comprises a first connecting piece disposed at the at least one of the first and second ends of the heating core;
wherein the heating component further comprises a second connecting piece disposed in the core tube and electrically coupled with the positive temperature coefficient thermistor;
wherein the second connecting piece includes an extending part extended out of the core tube and electrically coupled with the first connecting piece; and
wherein the first connecting piece and the extending part are disposed within the sealing-waterproof glue member.

20. An electric heater, comprising:
an outer frame;
a heating core disposed within the outer frame, wherein the heating core comprises a first end and a second end, wherein at least one of the first and second ends is configured to connect to a power source; and
a sealing-waterproof glue member disposed within the outer frame and configured to encase the at least one of the first and second ends of the heating core;
wherein the heating core further comprises a plurality of heat dissipating components and a plurality of heating components, the heating component comprising a core tube and a positive temperature coefficient thermistor disposed in the core tube;
wherein the heating components and the heat dissipating components are arranged alternately, and adjacent heating component and heat dissipating component are spaced apart from each other and are coupled with each other via a thermal conductor; and
wherein the core tube comprises two load-bearing walls and two heat dissipating walls opposed to the heat dissipating components adjacent thereto.

* * * * *